UNITED STATES PATENT OFFICE 2,080,910

METHOD OF REMOVING RUBBER FROM MATERIALS CONTAINING IT

Kenneth W. Coons, Hamburg, N. Y., assignor to National Aniline and Chemical Company, Inc., New York, N. Y., a corporation of New York No Drawing. Application July 1, 1935, Serial No. 29,378

8 Claims. (Cl. 18—52)

This invention relates to removal of rubber from mixtures thereof with other materials, for example inert material such as fillers or binders.

My invention is applicable to the recovery of the various inert materials normally employed in rubber products, for example fillers such as lamp black, zinc oxide, etc. and binders or reinforcing members, for example, animal or vegetable textile or metal reinforcements and in general those inert materials which are mixed with rubber in the manufacture of rubber tires, hose, shoes, belting, sheeting, and so forth.

The invention finds particular application in the recovery of fibrous cellulosic textile material from waste rubber-containing material such as rubber tires. The processes by which the rubber from such waste rubber products is normally reclaimed rarely remove the rubber completely, and leave the cord or fabric structure in the form of cotton waste to which a substantial percentage of vulcanized rubber adheres. The presence of this rubber prevents the utilization of this fibrous material for many purposes for which it is otherwise suited. By the application of my process the fibrous material, whether or not it has been previously treated for reclamation of rubber, may be substantially completely freed from rubber and thereby made suitable for various uses, for instance as a filler or binder in plastics or resins, or as stock for conversion to pulp for the manufacture of paper, etc.

In accordance with the present invention I have found that by the action of an alkyl nitrite the rubber in mixtures thereof with fillers, binders, etc. may be dissolved or decomposed and removed completely from the said fillers, binders, etc. which are not attacked chemically or dissolved by the alkyl nitrite and are left as a residue in relatively pure form, substantially free from rubber. Alkyl nitrites, such as propyl nitrite, butyl nitrite, decyl nitrite, hexyl nitrite, etc., or the nitrites of the polyhydroxy alcohols may be used.

I have found amyl nitrite to be particularly suited for my process.

The amyl nitrite is capable of removing rubber in accordance with the present invention by treatment at ordinary or elevated temperatures. However, the reaction is accelerated by heat and hence I prefer to employ temperatures within the range 50° to 150° C. While higher temperatures give more rapid extraction of rubber, they may cause deterioration of the fabric of the stock. Where a material which is unaffected by amyl nitrite at elevated temperatures is to be recovered, it is obvious that this limitation does not apply, and the temperature may be selected with a view to most effective conditions of operation with due regard for the material being recovered.

The amyl nitrite may be used alone or it may be used as a solution, which contains the nitrite in substantial percentage, for example about 5%, in any suitable solvent or mixture of solvents. In general those solvents or diluents having a boiling point within the range 50° to 150° C. are satisfactory. However, solvents having a boiling point not above that of amyl nitrite (99° C.) may be used to especial advantage since amyl nitrite tends to decompose at temperatures above its boiling point. Examples of suitable solvents are benzene, toluene, alcohols, alkyl ethers, and carbon tetrachloride.

The following examples will serve to illustrate the process of my invention.

*Example 1.*—35 parts of rubber-containing waste fiber stock obtained from pneumatic tires were placed in the thimble of a Soxhlet type of extraction apparatus and 20 parts of amyl nitrite were placed in the distillation-bulb thereof. The amyl nitrite was heated to boiling, the vapors being condensed so that condensate passed through the fiber stock in the thimble, thus extracting the rubber therefrom. After 12 hours of this treatment, there was obtained a fiber stock of light gray color substantially free from rubber. In order to eliminate from the derubberized fiber stock, such impurities as fillers and other materials which may be present in the rubber, the stock may be washed advantageously with boiling water or with a boiling solution of sodium carbonate, of ½% to 10% concentration, in the presence or absence of a dispersing agent and/or detergent.

*Example 2.*—35 parts of solid tire rubber in finely divided condition were mixed with 330 parts of amyl nitrite and heated at boiling under a reflux condenser for two hours. At the end of this treatment the solution was filtered and the residue was washed with alcohol and dried. It consisted of carbon black substantially free from rubber.

*Example 3.*—To 60 parts of a fiber stock of the type treated in Example 1 there were added 435 parts of a 50% (by weight) solution of amyl nitrite in benzene. The mixture was heated under a reflux condenser for 4.5 hours. The reaction mixture was filtered. The residue was washed first with alcohol and then with water and finally dried. A cotton stock was thus obtained substantially free from rubber.

*Example 4.*—In the process of Example 3, 435 parts of a 10% solution of amyl nitrite in benzene were employed in place of the 50% solution of Example 3. The period of refluxing was extended to about 21 hours. At the end of this time the cotton stock was found to be substantially free from rubber.

I claim:

1. The method of removing rubber from a rubber-containing material, which comprises treating the material with an alkyl nitrite.

2. The method of recovering inert material from a vulcanized rubber product containing the same, which comprises subjecting the product to the action of an alkyl nitrite.

3. The method of recovering cellulosic material from a product containing such material having rubber deposited thereon, which comprises extracting rubber therefrom by means of an alkyl nitrite and separating the cellulosic material from the resultant solution.

4. The method of removing rubber from a rubber-containing material, which comprises treating the material with an alkyl nitrite in liquid phase, withdrawing liquid from undissolved residue, distilling and condensing the liquid, and treating rubber-containing material with the condensate.

5. The method of recovering inert material from a vulcanized rubber product containing the same, which comprises heating the product with amyl nitrite.

6. The method of recovering cellulosic fibrous material from a product containing such material having rubber deposited thereon, which comprises heating the product with amyl nitrite at a temperature between 50° and 150° C. until substantially all of the rubber is dissolved and thereupon separating the cellulosic material from the resultant solution.

7. The method of removing rubber from a rubber-containing material, which comprises heating the material with amyl nitrite at a temperature between 50° and 150° C.

8. The method of recovering cellulosic fibrous material from a product containing such material having rubber vulcanized thereon, which comprises heating the product with amyl nitrite at a temperature between 50° and 150° C. in liquid phase, withdrawing liquid from undissolved residue, distilling and condensing the liquid, and heating the rubber-containing cellulosic fibrous material with the condensate.

KENNETH W. COONS.